May 25, 1948.	D. E. HOOKER ET AL	2,442,240
PHOTO-ELECTRIC DEVICE
Filed Feb. 20, 1942	4 Sheets-Sheet 1
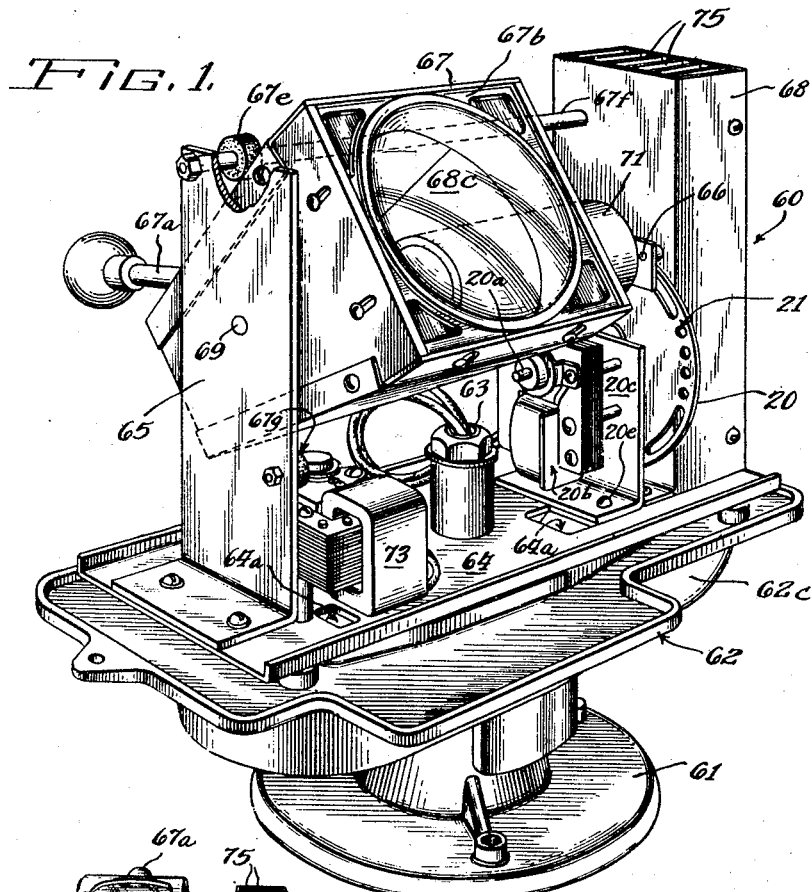
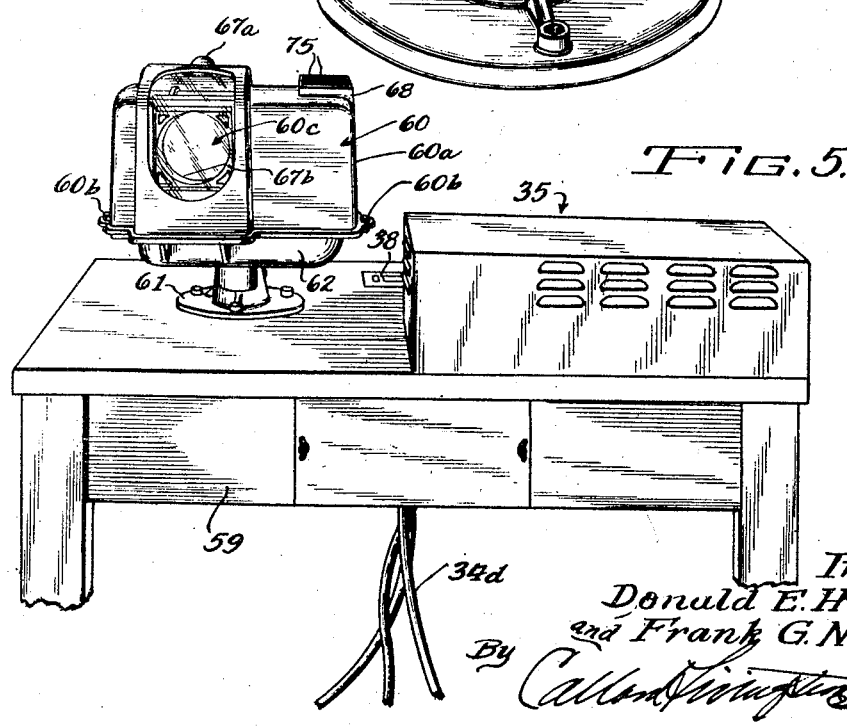
Inventors
Donald E. Hooker
and Frank G. Nicolaus
By
Attorney

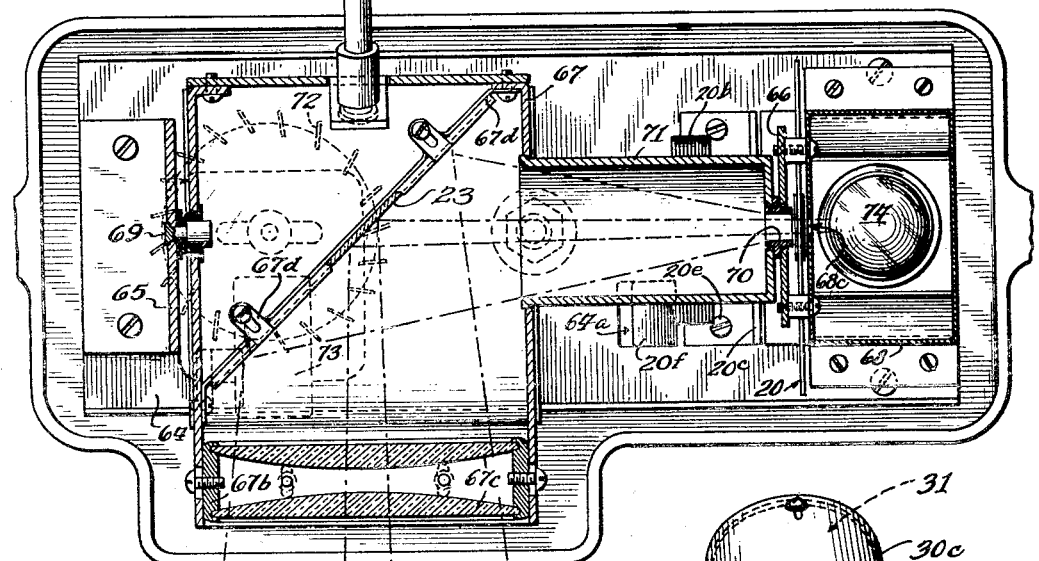

May 25, 1948.　　　D. E. HOOKER ET AL　　　2,442,240
PHOTO-ELECTRIC DEVICE
Filed Feb. 20, 1942　　　　　4 Sheets-Sheet 3
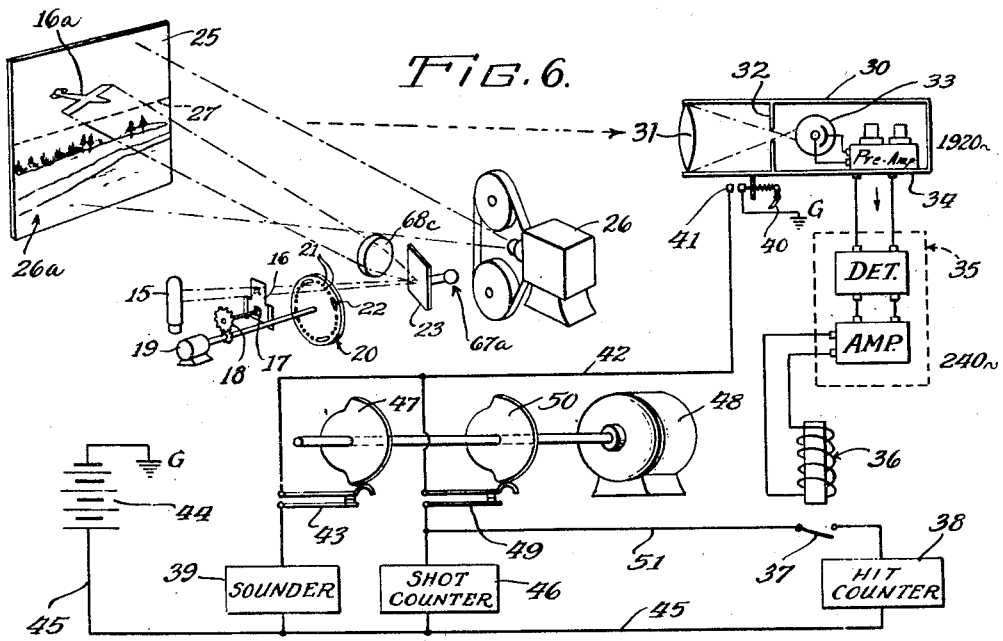
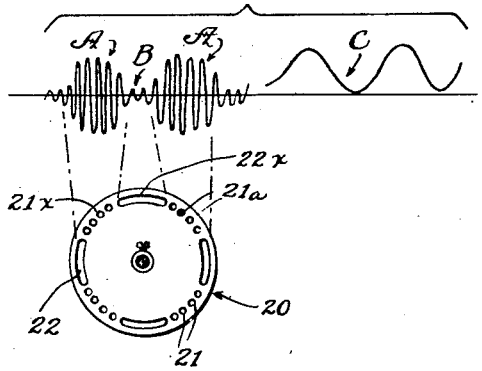
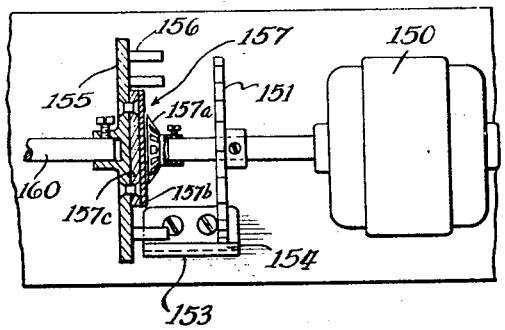
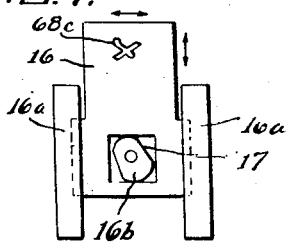
Inventors
Donald E. Hooker
and Frank G. Nicolaus
By Allen Livington R Usmey May 25, 1948. D. E. HOOKER ET AL 2,442,240
PHOTO-ELECTRIC DEVICE
Filed Feb. 20, 1942 4 Sheets-Sheet 4

Inventor
Donald E. Hooker
and Frank G. Nicolaus
By Allen Livingston Attorney

Patented May 25, 1948

2,442,240

UNITED STATES PATENT OFFICE 2,442,240

PHOTOELECTRIC DEVICE

Donald E. Hooker and Frank G. Nicolaus, Chicago, Ill., assignors to Raymond T. Moloney, Chicago, Ill.

Application February 20, 1942, Serial No. 431,672

17 Claims. (Cl. 250—41.5)

This invention relates to photo-electric apparatus and the use of modulated light in conjunction with selective photo-electric circuits, and controlled means operated thereby responsive to the discriminative operation of the photo-electric circuit when actuated by appropriately modulated light.

One of the principal objects of the invention is to provide a highly discriminative photo-electric marksmanship apparatus in which a light beam, modulated in a particular manner, is projected onto a suitable reflecting surface to provide a target image at which the marksman aims a photo-electric gun having circuit means to operate hit-indicating means in such manner that the latter will be actuated only by accurate aiming of the gun at the modulated light target, notwithstanding the presence of otherwise disturbing sources of light of variable character and random frequency range.

A further object is the provision of a compact and efficient light projecting and modulating means.

Another object is the provision of means for modulating light to actuate a discriminative photo-electric device, which modulating means varies the intensity of the light in a certain manner to operate the photo-electric apparatus, and at the same time provides a high degree of average light intensity for defining a brilliant target image, notwithstanding the repeated dimming of the image light from a maximum to a minimum value by the modulating means.

Still another object is the provision of modulating means adapted to produce a light pattern that makes possible a highly discriminative photo-electric pick-up apparatus which does not require involved or expensive parts such as are usually needed for a critically tuned circuit, and which effects economies and simplification in production.

Yet another object is the provision of power-driven means for meandering the target image in an irregular manner.

Other objects, advantages and novel aspects of the invention relate to certain details of construction and operation of the component parts of the illustrative embodiment described in the following specification and shown in the annexed drawing in which:

Fig. 1 is a perspective of the projector unit with the cover removed;

Fig. 2 is a horizontal section through the zenith axis of the projecting unit of Fig. 1;

Fig. 3 is a vertical sectional fragment of the lamp housing shown in Fig. 2;

Fig. 4 is a perspective view of the pick-up or light gun with the cover removed and portions of the mounting brackets broken away;

Fig. 5 is a perspective of the projecting table with lower portions of the legs cut away, showing the projector and amplifier units mounted thereon;

Fig. 6 is a schematic diagram of a modified form of projective arrangement and circuit connections for the photo-electric gun and score counting means;

Fig. 7 is an elevational view of a variator for the image forming means;

Fig. 8 is a graphical representation of the wave form of the amplified and rectified signals in the photo-electric circuit, representative of the double-modulated light tuning means of the invention;

Fig. 11 is a detail of the slip clutch.

Figure 9:
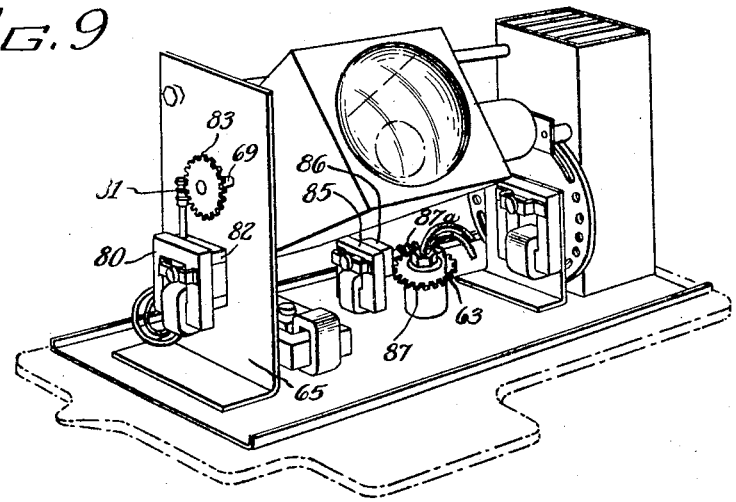
Fig. 9 is a perspective of a modified form of projector with power driven meandering means.

The present application is in part a continuation of disclosures in the co-pending application of Donald E. Hooker, filed February 12, 1941, S. N. 378,645. In that application means are disclosed for projecting modulated light to provide a target image which can be picked up or "hit" only by a selective or discriminative aiming device. The present invention provides improved modulating and discriminating means, together with structural improvements in connection with both the target-projecting mechanism and the aiming device.

In its more general aspects, the invention is best explained by reference first to the schematic showing of Fig. 6 herein, in which there is shown a light source 15 which projects light through an image forming device 16 adapted to be moved by a cam arrangement 17 (see Fig. 7 also) driven through a train of gears 18 by a motor 19. In the present instance, the image forming device 16 is designed to define the image of an airplane, which image is adapted to be projected on a reflecting surface, such as the screen 25 or a wall surface or the like, the light rays which define such image being reflected from a dirigible reflecting device or mirror 23.

The image-forming rays from source 15 are modulated or "keyed" by a special form of interrupter disc 20, which (see also Fig. 8) includes a group of serial holes 21, in this instance four in number, alternating with elongated slots 22 adapted to provide a peculiar modulation, which for present purposes may be referred to as double modulation, and which is most conveniently interpreted in terms of the resultant amplified signal or amplified photo-electric-impulse wave forms shown in Fig. 8, wherein the wave form or component A represents the first or principal modulation (after amplification) effected upon the light which is permitted to pass by any given group of small holes 21, while the smaller wave component B represents the second modulation due to the slots 22, with an obviously lesser frequency amplitude than those caused by the series of holes.

Regarded in another aspect, the wave components A and B may also be considered to represent the output signal of the photo-electric device after amplification by amplifier 34, or conversely the input signal as received by the detector or rectifier, while the third wave form C in Fig. 8 represents the rectifier signal of predetermined frequency delivered at the output of the main amplifier for purposes of operating a score control device or the like.

For present purposes, it is sufficient to state that the disc 20 is rotated at a speed correlated to the size and spacing of the modulating or light-keying formations, that is the holes and slots, which will cause the light beam to be interrupted at a principal frequency of 1920 times per second, (by holes 21) and at a secondary or superimposed frequency of 240 times per second (by slots 22). The peculiar advantages flowing from this arrangement will be discussed hereinafter.

Referring again to Fig. 6, there is additionally provided a background projecting means such as a moving picture projector 26 adapted to project suitable background scenery 26a onto the screen 25 as indicated below the dotted line 27, the image 16a of the airplane being indicated above the dotted line. The image may be moved about at will over the background images without interference from the latter.

The arrangement further includes an aiming device or gun 30 preferably provided with an objective lens 31 adapted to collect the target image rays from screen 25 for passage through an aperture plate 32 and onto a photo-electric cell 33 connected with a pre-amplifier 34 which is housed in the gun 30 and which is peaked or tuned to 1920 cycles. The pre-amplifier has its output connected to a main detector-amplifier unit 35, including a detector or rectifier DET., and an amplifier AMP., which is discriminative for maximum output at about 240 cycles per second.

The amplifier output is connected to a controlled instrumentality, such as the hit relay 36, which in turn controls through its switch 37 an electrically operated hit or score counter 38 of known construction.

In order to provide a realistic effect, an electrically operated shot sounder 39 of known construction is connected for operation from a power supply or battery 44 under control of a fire switch or trigger 40 which completes a power circuit to the shot sounder from a common or ground connection G through contacts 41, conductor 42 and interrupter cam switch 43 to the sounder 39, and via conductor 45 to battery 44.

An interrupter motor 46 drives a cam 47 to effect opening and closing of switch 43 at a desired "firing" rate of 850 times per minute, while another cam 50 opens and closes a supervisory switch 49 at the same rate to intermittently connect both the shot counter 46 and hit counter 38 (through hit relay switch 37) with the power source or battery 44 via conductors 51 and 45.

As a result of the foregoing arrangement, it will appear that it is necessary that trigger switch 40—41 be closed in order to condition the hit and shot counters for operation and to actuate the sound-effect device 39, and that these control circuits are interrupted at a rate of 850 times per minute by the interrupter cam switches.

If the gun 30 were properly trained upon the luminous target image 16a for the duration of a minute, a perfect score would be registered, indicating 850 shots on the shot counter 46 and 850 hits on the hit counter 38. When the target is moving, of course, the marksman's skill in keeping the weapon trained during the intervals when the trigger is pulled, is measured by a comparison of the readings of the hit counter 38 and the shot counter 46.

By modulating the light employed to define a target image such as the image of the airplane 16a, Fig. 6 and by tuning the amplifiers 34 and 35, or either of them, to the frequency of the modulation, the system is rendered highly selective, so that it is not only possible to use the device in the presence of extraneous modulated light, such as that supplied by incandescent lamps from the usual alternating current mains (ordinarily interrupted 120 times per second) but in addition it is possible to deliberately project variably modulated light, as by the motion picture projector 26, with such a high degree of selectivity in the pick-up device 30 and the associated amplifying means, that the light fluctuations caused by the motion picture projector 26 or analogous device, in no way interfere with the proper operation of the photo-electric means even though they may contain random component frequencies of the modulation frequencies. Thus false indications of a hit by the counting device 38 are obviated, and the adaptability of the system as a whole is vastly extended.

In accordance with the present invention both the selectivity and the sensitivity of the photo-electric system have been greatly increased by contriving a certain kind of modulation, which for purposes of present disclosure, is referred to as double modulation. This is conveniently explained by reference to Fig. 8 wherein there is shown one of the modulating discs 20, and immediately thereabove a graphical representation of the approximate variations in projected light (and hence in the electrical impulses or signals resultantly stimulated thereby in the photo-electric means 30—34).

It will be further observed from Fig. 8 that dotted-line projections have been extended from the uppermost elongated slot 22 to the small-amplitude wave lines indicated at B thereabove, while dotted lines extend from the two flanking groups of holes 21 upwardly to the corresponding high-amplitude portions A of the wave representation.

In the foregoing illustration, it will be appreciated that during that portion of the rotation of the modulating disc 20 when the holes 21 are passing before the projecting aperture, the projected light will be interrupted rapidly with relatively small amounts of light passing through as each of the small holes cuts across the light path, but when the relatively open elongated slots 22 cut across the light path, a considerably larger amount of light is permitted to pass and the frequency of interruption drops as shown graphically by the component B of the wave-form representations. The resultant rectified impulse which leaves the main amplifier unit 35 to operate the controlled instrumentality or hit counter relay 36, has the wave form represented at C of Fig. 8, which form is particularly effective for its intended purpose, and is made possible by the original double modulation A—B resulting from special modulating formations 21—22.

In other terms, the dual modulation increases the discriminative action of the device since the pick-up can be tuned to both modulating frequencies; for example, the pre-amplifier 34 in this case is tuned preferably to 1920 cycles, while the second main amplifier, AMP., following the detector, DET., may be inexpensively "tuned" to the frequency of the rectified or detected impulses—in this case, preferably 240 cycles.

Since the methods of tuning such amplifier circuits are well known in the art and do not constitute per se the invention herein, the specific circuits are not described in detail.

The pick-up or gun 30 is shown in detail in Fig. 4, and includes a box-like housing 30a mounted on support bars 30b, and provided with a barrel portion 30c in the front end of which is a telescoping lens mount 30d carrying a collecting lens 31.

A light spot focusing plate 30e is slidably and rockably mounted by means 30f to the rear of the barrel in front of the photo cell 33, and the plate is pulled toward the right by a spring 30g against an azimuth adjusting set screw 30h, and also downwardly against a zenith adjusting set screw, 30J (dotted lines), by means of both of which the light aperture 30k in the plate may be adjusted with respect to the photo cell 33.

Pre-amplifier elements or tubes 34a and 34b, and tuning choke 34c are also situated within the gun housing and adapted to be connected with the main amplifier unit 35 by a cable lead 34d leading to the control table 59, shown in Fig. 5 upon which the projector unit 60 and main amplifier unit 35 are mounted. The gun housing 30a is normally closed by a cover (not shown).

*The projector*

As viewed in Figure 1, the projector consists of a base 61, upon which is mounted a hollow turret plate casting 62 to swivel about a hollow shaft 63. Upon a bed plate 64 is mounted an upright bracket 65 constituting one of a pair of trunnion members for a rockable lens and projection housing 67, the other trunnion member being a small plate 66 mounted (see also Fig. 2) on the side wall of a lamp housing 68. Plate 64 constitutes a cover for recessed parts 62C.

At one (left) side the lens housing pivots on a pin 69 in bracket 65, while at its opposite side it pivots upon a bushing 70 (Fig. 2) seated in plate 66 and fixed in the end of a tubular extension 71 secured to the lens housing in alignment with its rocking axis. (See also Fig. 3.)

Referring to Fig. 3, the lamp well or housing 68 is seated on the bed plate 64, and includes a lamp socket 68a mounted on posts 68b by screws 68d threaded into bosses 62a on the turret plate just above a hollow air-flow passage 62c formed in the turret plate. Air passages 64a are provided in the bed plate for air driven by a fan 72 driven by small motor 73 (dotted lines Fig. 2), so as to cool a powerful electric lamp 74. The top of the lamp housing is open and provided with cooling louvres 75 (Figs. 1 and 3).

A handle 67a projects from the rear of the lens housing for manipulation by the instructor.

At the front of the housing is a cast lens mount or frame 67b (Fig. 2) in which are mounted a pair of condensing lenses 67c in alignment with a reflecting mirror 23 secured by brackets 67d across the interior of the lens housing in the path of light from lamp 74 passing through an aperture 68c in the lamp housing, so as to redirect the light at right angles to its original path of projection from the lamp housing. A rubber buffer or stop collar 67e is mounted on a tie rod 67f joining bracket 65 and housing 68 to cushion upward or zenith movements of the projector housing, while another stop 67g on post 65 stops downward motion thereof.

A very important feature of the invention is the modulating disc 20, which is fast on the shaft 20a of a small synchronous motor 20b secured to a mounting plate 20c fastened as at 20e to the bed plate. A baffle 20f serves to direct air from the hollow turret plate through one of the openings 64a to cool this motor. The small holes 21 and slots 22 of the modulating disc pass in optical alignment with the aperture 68c in the lamp housing, and bushing 70, so as to interrupt the light to be reflected from mirror 23 as heretofore described.

As viewed in Fig. 5, the projector is provided with a cover or hood 60a fastened onto the turret plate as at 60b, and includes an arcuate window 60c before which the lens housing can rock.

The form of projector just described is rocked up and down and sidewise by manipulation of handle 67a by the instructor, who is positioned before the table 59, while the marksman manipulates the gun 30 and endeavors to follow the target image of light as it is cast about the walls or onto a screen 25 by the instructor. If desired, the aperture 68c of Fig. 3 may be shaped to define the outline of an aeroplane, tank or other object of warfare, or an image-defining plate such as the plate 16 (Fig. 7) may be interposed in the path of the light rays before interruption by disc 20. The image plate 16 may be mounted in slide brackets 16a for both vertical and horizontal movement by a harmonic cam 16b working in a square (or otherwise designed) cam hole in plate 16 to cause the outline to move with a complex motion. The motor 19 may be used for this purpose with a train of gears 18 interposed. It should be understood that the size of the openings 21 and 22 is dimensioned to correspond to the size of the aperture 68c or the image-defining outline of the aeroplane, the latter being somewhat exaggerated by size in Fig. 7 for clarity.

*Power-driven meandering means*

In Fig. 9 there is shown a modified form of the projector of Fig. 1 wherein power-driven meandering means is substituted for the manual control. To this end, there is provided a small motor 80 mounted on bracket 65 and arranged to drive a worm 81 through a speed reducer 82 to slowly drive a pinion 83 fixed on the rock shaft 69 of the lens and projector housing.

Another small motor 85 seated on the base plate, is likewise provided with a speed reduction unit 86 driving a worm 87a which in turn drives a pinion 87 fixed to rotate the shaft 63. Motors 80 and 85 are connected to a special control circuit which reverses them at appropriate intervals, and also varies their speed in a scrambled manner to produce irregular meandering of the projector.

Figure 10:
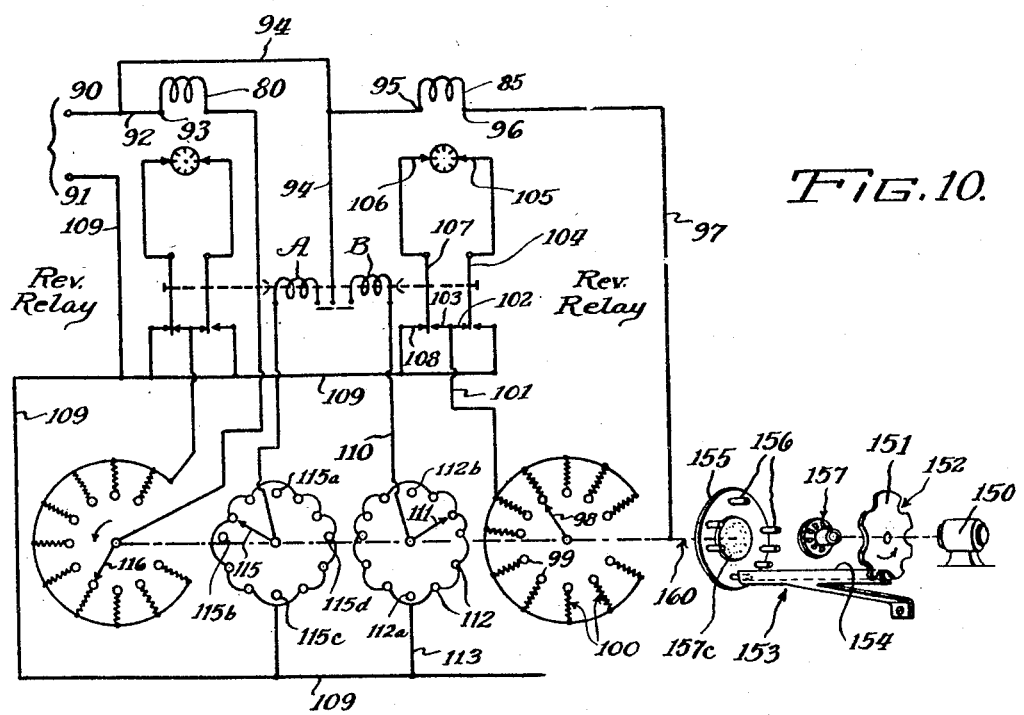
Fig. 10 is a circuit diagram for the projector of Fig. 9.

In Fig. 10 there is shown circuit means for meandering the projector, which includes the two motors 80 and 85 connected with reversing relays and commutating control switches and a scrambling device. Motors 80 and 85 are connected in the same manner to have their speeds varied by cutting in resistance, and to be reversed by reversing relays.

The illustrative arrangement of Fig. 10 provides a connection from power terminal 90 via conductor 92 to field terminal 93 of motor 80, and via conductor 94 to field terminal 95 of motor 85.

A reversing connection is effected from field terminal 96 of motor 85 via conductor 97 to a commutator switch wiper 98 adapted to successively engage contacts 99 each connected to a resistance 100. This field circuit is completed via conductor 101 to contacts 102—103 on a reversing relay having a movable contact 104 which engages normal contact 102 when the relay is dropped out. Contact 104 is connected to motor brush 105, and this circuit is completed from the other brush 106 via movable contact 107 and its normal contact 108 power lead 109 and back to power terminal 91, so that motor 85 will run in a certain direction and at varying speeds, depending on the passage of wiper contact 98 into and out of engagement with resistance contacts 99.

Motor 85 will be reversed by energization of winding B of its reverse relay from conductors 94 and 110, the latter connecting with a rotary wiper 111 adapted to engage in succession looped contacts 112 on the corresponding commutator switch and which are connected to the remaining power lead 109 by conductor 113.

Relay winding B will remain energized so long as wiper 111 engages a contact 112 connected to power lead 109, and will reverse the connections between brushes 105—106 and field coil terminal 96. By arbitrarily connecting contacts 112 in random order to the power line, the reversing relay B may be operated to cause reversals at irregular intervals thus scrambling the component of motion of the projector contributed by motor 85.

Exactly the same kind of a reversing circuit is supplied for motor 80 under control of reversing relay A, and it is therefore believed unnecessary to repeat the explanation of the duplicate circuit connections shown in Fig. 10 for motor 80.

*Scrambling control*

Means for further rendering irregular the operation of the aforesaid meandering or scrambling control for the projector includes a driving motor 150 (Fig. 10) for the several commutator switch wipers 98, 111, 115, 116, for both motors 80 and 85. This motor 150 drives a variator disc 151 having notches 152 of irregular length cut in its periphery. A springy brake arm 153 is arranged so that its offset end 154 rides on said periphery into and out of the notches thereon. (See also Fig. 11.)

In axial alignment with disc 151 is a driven member or pin disc 155 having a plurality of axially projecting pins 156 projecting from its face toward the variator disc and so arranged as to strike against the brake arm 153 when the latter is bearing as far as it can toward the variator disc by virtue of the offset 154 riding in one of the notches 152, in which position the brake arm is disposed in the path of the pins 156. As soon as the offset nose 154 of the brake arm rides out of a notch onto the normal periphery, the brake arm is sufficiently withdrawn from the path of the pins to permit the pin disc 155 to rotate freely, which it will do through the agency of a special slip clutch 157.

Slip clutch 157, as shown in Fig. 11, consists simply of a metal spring washer or spider 157a and alternate metal and felt washers 157b, 157c, the latter being firmly pushed against the face of pin disc 155 by action of the spider washer 157a, so that the pin disc tends to be carried around with the variator disc owing to frictional drive afforded by the felt washer, although a sufficent resistance, such as blocking of pins 156 by the brake arm 153 would restrain the pin disc.

Pin disc 155 is connected by the dash-dot line 160 to drive the commutator switch wipers 98, 111, 115, 116 for varying the speed and direction of rotation of the projector motors 80 and 85, and since the notches 152 are cut irregularly in the variator disc, and pins 156 are set irregularly (with respect to circumferential spacing relative to each other) it will be apparent that pin disc 155 and hence the drive connection 160 for the commutating switches will be started and stopped in an irregular fashion, thus causing motors 80 and 85 to operate irregularly, and thus "scrambling" or rendering relatively uncertain the movements of the target image 16a, etc.

The objects and advantages of the invention may also be realized by modifications in the specific illustrative construction and arrangements disclosed herein, and it is the intention that all such modifications and equivalent arrangements shall be included in the invention as defined in the appended claims.

We claim as our invention:

1. In apparatus of the class described, a projector comprising a housing mounted for rocking movement, hollow means providing a rocking support for said housing, means for projecting light through said hollow means into said housing, and means in said housing for directing light projected as aforesaid outwardly of the housing at an angle to the rocking axis thereof, a member mounted to rotate through the path of light from said projecting means, means for rotating said member, said member having means for variantly interrupting said light in projection as aforesaid.

2. In a projector, a housing having light-directing means therein, means pivotally supporting said housing and including a light-transmitting portion optically aligned with said directing means, a light source arranged in alignment with said light-transmitting portion to emit light for passage to said directing means, and means movable across the path of light from said source to vary the intensity thereof periodically from a minimum value greater than zero, to a maximum value.

3. Apparatus of the class described comprising, in combination: a light source, photo-sensitive means to be actuated by light from said source, a controlled instrumentality operable under control of said photo-sensitive means, means for modulating light from said source before reaching said photo-sensitive means so that said last-mentioned light will be variable with at least two different modulation frequency components, and discriminative means effectively responsive to the aforesaid frequency components, operatively associated with said photo-sensitive means, and interposed operatively between the latter and said controlled instrumentality for preventing operation of the latter under control of the photo-sensitive means except by actuating impulses from the latter occurring at a frequency which includes said modulating frequency components in predomination.

4. In a discriminative photo-electric system, a revoluble light modulating disc having light passages concentric with the center of revolution and consisting of groups of successive circular openings separated by arcuately elongated openings extending in the direction of rotation and each of length greater than the width of any single opening in said groups, measured in the direction of rotation, said passages being adapted to modulate light projected therethrough during rotation of the disc to produce at least two modulating frequencies.

5. In a discriminative photo-electric system of the class described, a revoluble light-modulating disc for producing a complex modulating frequency and having a plurality of elongated light passages concentric with the axis of rotation of the disc and extending in the direction of rotation of the latter, said passages being of predetermined width in a radial direction, and said disc having groups of smaller circular passages situated in the regions between said elongated passages and of the same width as the latter in a radial direction, but each of substantially lesser width in the direction of rotation than the length of the elongated passages.

6. In a discriminative photoelectric system of the class described, light modulating means comprising an opaque member adapted to move across the path of light from a source, said member having serially occurring light passages therein, certain of said passages being elongated in the direction of movement of said member, successive elongated passages being separated by groups consisting of a plurality of smaller circular passages, whereby the frequency of interruption of light from said source is keyed for actuation of photo-responsive means tuned selectively to the same said frequency.

7. In apparatus of the class described, projecting mechanism for dirigibly emitting modulated light and comprising: means movable with respect to a plurality of axes for directing light, electrically operated drive means for moving said movable means with respect to each axis of movement thereof, and means for causing irregular operation of said drive means whereby to effect mixed resultant motions of said light-directing means, a relatively stationary light source for said directing means, means providing a path for transmission of light from said source to said directing means in all motions of the latter, and modulating means mounted in position relatively fixed with respect to said directing means and motions thereof and including a member movable with respect to said path and having light-permeable portions of different extent in the direction of movement of said member relative to said path and adapted in said movement to interrupt light from the source at a predetermined modulation frequency, and means for moving the modulating member as aforesaid.

8. In a photoelectric marksmanship apparatus, improvements comprising the following, namely: a source of projecting light, modulating means interrupting said light at least at two determined frequencies, photoelectric means receiving said modulated light, a first amplifier tuned discriminatively to one of said frequencies, means rectifying the amplified frequency output of said first amplifier, a second amplifier tuned discriminatively to another of said determined frequencies, and score indicating means operably controlled by the output of said second amplifier.

9. In a photoelectric marksmanship device, improvements comprising the following, namely: a source of projecting light, a rotated interrupter having light passages of different length in the direction of rotation thereof for complexly modulating said light with a higher frequency of interruption and a lower frequency of interruption; photoelectric means receiving modulated light aforesaid, a first amplifier receiving the output of said photoelectric means and tune to said higher frequency, means detecting, that is to say rectifying, the output of said first amplifier, a second amplifier tuned to said lower frequency and receiving the detected, that is to say, rectified, output of the first amplifier, and scoring means operably controlled by the output energy from said second amplifier.

10. Photoelectric marksmanship apparatus comprising aimable photoelectric means, amplifying means in circuit to amplify photoelectric responses of said photoelectric means, a dirigible source of target light to be thrown upon a receiving surface in places where there may be present unwanted luminosities which could disturbingly actuate said photoelectric means, means modulating said target light at two frequencies, at least, selective circuit means cooperable with said amplifying means for substantially rejecting photoelectric responses at frequencies other than said modulating frequencies, means cooperable with said amplifying means for resolving complex photoelectric responses at said modulating frequencies to a single rectified control frequency of substantially uniform amplitude, and controlled means actuated by said rectified control frequency.

11. Photoelectric marksmanship apparatus comprising a photoelectric aiming means, a source of target light modulated with a complex frequency characteristic, selective circuit means operatively associated with said photoelectric aiming means for substantially attenuating photoelectric responses at modulation frequencies other than those of said complex frequency, demodulating means rectifying responses at said complex frequency of the photoelectric means to an undulating control current of lower frequency than any component of said complex modulation frequency, and indicating means controlled by said control current.

12. Photoelectric marksmanship apparatus comprising a source of light, a modulating disc rotatable through the path of light from said source and having serial light passages concentric with the axis of rotation thereof, there being a plurality of separate passages followed by an elongated passage occupying approximately the same length of arc as each series of passages, first mentioned, said series of passages and elongated passages occurring in alternation about a circumference on said disc, whereby light is rapidly interrupted at a first modulation frequency by the passages of said series, and less rapidly at a second modulation frequency by said elongated passages, photoelectric means aimable upon said modulated light, means receiving photoelectric responses at both modulation frequencies from said photoelectric means and resolving said responses by demodulation to a resultant control frequency, and score means operably controlled by said control frequency.

13. The apparatus set forth in claim 12 in which there is further provided amplifying means peaked for effective response only to said first and second modulating frequencies and operably interposed between said photoelectric means and said score means to prevent operation of the latter by photoelectric responses at frequencies other than said modulation frequencies or demodulations thereof.

14. Photoelectric marksmanship apparatus including a source of target light, a single modulating disc rotating in the path of said light from said source and having modulating passages of different extent in the direction of its rotation whereby to interrupt passage therethrough of said light at a complex frequency or modulation rate in which interruption and passage of light from the source through the disc is a function of angular displacement rate and extent, with regard to direction of rotation, of said passages, photoelectric means receiving said modulated light, means demodulating said light to produce a control voltage of undulatory character at a frequency lower than any modulation component of said complex frequency, and means operatively associated with said photoelectric means for effectively rejecting responses of said photoelectric means to frequencies other than said modulation frequencies.

15. In a photoelectric apparatus, a rotatable modulating disc having equally spaced arcuate light slots concentric with its center of rotation about a circumference on said disc, and a series of smaller light holes between said slots, each said series occupying a length of arc approximately equal to that occupied by one of said slots, means for rotating said disc, means emitting light for modulation by passage through said slots and holes, said arrangement of slots and holes extending in alternation about said circumference and functioning to give an optimum brilliancy and quantity of light interrupted in a predetermined complex frequency pattern and rate, which is a function, at least, of the number and arcuate extent of said slots and holes and the angular displacement thereof relative to said emitting means, together with photoelectric means receiving said modulated light, at least, and including a demodulator altering said complex frequency pattern to a simplex frequency pattern affording a rectified control frequency, means cooperable with said photoelectric and demodulator means for substantially rejecting responses thereof to light modulation frequencies other than those of said complex modulation frequency, and controlled means actuated under control of said simplex or rectified control frequency.

16. In photoelectric marksmanship apparatus, a source of light and photoelectric means to be actuated thereby by adjustment of aim, one with respect to the other, means interrupting light from said source at two frequencies, at least, the amplitude of light at a given instant at either of said frequencies passing said interrupting means being the same, frequency-discriminative means receiving responses of said photoelectric means and effectively rejecting those responses which are not of said two interrupting frequencies, and score-hit indicating means operably controlled by photoelectric responses at said two interrupting frequencies.

17. In photoelectric apparatus, the combination of a source of light which is rapidly interrupted at two different rates, at least, and photoelectric means actuated by said interrupted light to produce a photoelectric current varying correspondingly with said two rates, detecting means for deriving an undulatory control current of single rate from said photoelectric current, and indicating means controlled by said control current.

DONALD E. HOOKER.
FRANK G. NICOLAUS.

REFERENCES CITED

The following references are of record in the file of this patent:

UNITED STATES PATENTS

| Number | Name | Date |
|---|---|---|
| 1,011,593 | Dudley, Jr. | Dec. 12, 1911 |
| 1,207,411 | Keen | Dec. 5, 1916 |
| 1,471,031 | Johnston | Oct. 16, 1923 |
| 1,598,433 | Fuog | Aug. 31, 1926 |
| 1,819,954 | Hansen | Aug. 18, 1931 |
| 1,848,795 | Nier | Mar. 8, 1932 |
| 1,880,105 | Reifel | Sept. 27, 1932 |
| 1,886,939 | Cameron | Nov. 8, 1932 |
| 1,929,589 | Joy | Oct. 10, 1933 |
| 1,930,137 | Twyman | Oct. 10, 1933 |
| 2,042,174 | Foisy | May 26, 1936 |
| 2,052,960 | Berggren | Sept. 1, 1936 |
| 2,089,901 | Kollmayer et al. | Aug. 10, 1937 |
| 2,139,210 | Sauerbier | Dec. 6, 1938 |
| 2,166,947 | Fayerweather | July 25, 1939 |
| 2,227,007 | Schlesinger | Dec. 31, 1940 |
| 2,227,037 | Schlesinger | Dec. 31, 1940 |
| 2,228,551 | Younghusband | Jan. 14, 1941 |
| 2,335,257 | Binks | Nov. 30, 1943 |
| 2,347,657 | Binks | May 2, 1944 |
| 2,241,964 | Schlesinger | May 13, 1941 |
| 2,269,794 | Stechbart | Jan. 13, 1942 |

FOREIGN PATENTS

| Number | Country | Date |
|---|---|---|
| 6,682 | Great Britain, 1913 | Mar. 18, 1913 |
| 179,599 | Great Britain | May 2, 1922 |
| 220,992 | Great Britain | Aug. 29, 1924 |
| 722,578 | France | Mar. 22, 1932 |